US010059598B2

(12) United States Patent
Le Roux et al.

(10) Patent No.: US 10,059,598 B2
(45) Date of Patent: Aug. 28, 2018

(54) METHOD FOR PREPARING A COMPOSITION COMPRISING FUNCTIONALISED SILICO/GERMANO-METAL PARTICLES AND COMPOSITION OBTAINED

(71) Applicants: CENTRE NATIONAL DE LA RECHERCHE SCIENTIFIQUE (C.N.R.S.), Paris (FR); UNIVERSITE PAUL SABATIER TOULOUSE III, Toulouse (FR)

(72) Inventors: Christophe Le Roux, Avignonet-Lauragais (FR); Pierre Micoud, Peyssies (FR); Francois Martin, Sainte Foy d'Aigrefeuille (FR); Angela Dumas, Pechabou (FR)

(73) Assignees: CENTRE NATIONAL DE LA RECHERCHE SCIENTIFIQUE (C.N.R.S.), Paris (FR); UNIVERSITE PAUL SABATIER TOULOUSE III, Toulouse (FR)

(*) Notice: Subject to any disclaimer, the term of this patent is extended or adjusted under 35 U.S.C. 154(b) by 0 days.

(21) Appl. No.: 14/899,817

(22) PCT Filed: Jun. 20, 2014

(86) PCT No.: PCT/FR2014/051553
§ 371 (c)(1),
(2) Date: Jan. 21, 2016

(87) PCT Pub. No.: WO2014/202920
PCT Pub. Date: Dec. 24, 2014

(65) Prior Publication Data
US 2016/0137514 A1    May 19, 2016

(30) Foreign Application Priority Data
Jun. 21, 2013  (FR) .................................... 13 55964

(51) Int. Cl.
*C01B 33/44* (2006.01)
*C09C 1/42* (2006.01)
*C09C 3/12* (2006.01)
*C09C 1/28* (2006.01)

(52) U.S. Cl.
CPC .......... *C01B 33/44* (2013.01); *C01P 2002/72* (2013.01); *C01P 2002/78* (2013.01); *C01P 2002/86* (2013.01); *C09C 1/28* (2013.01); *C09C 1/42* (2013.01); *C09C 3/12* (2013.01)

(58) Field of Classification Search
CPC .................................................. C01B 33/44
See application file for complete search history.

(56) References Cited

U.S. PATENT DOCUMENTS

| 4,942,026 A * | 7/1990 | Gupta ..................... C01B 33/20 423/326 |
| 6,761,865 B1 * | 7/2004 | Gallup .................... C01B 33/22 210/696 |
| 2009/0252963 A1 * | 10/2009 | Martin ................... B82Y 30/00 428/402 |
| 2013/0343980 A1 | 12/2013 | Le Roux et al. |
| 2014/0205528 A1 | 7/2014 | Le Roux et al. |
| 2015/0133290 A1 | 5/2015 | Le Roux et al. |

FOREIGN PATENT DOCUMENTS

| WO | 2012085239 | 6/2012 |
| WO | 2013004979 | 1/2013 |
| WO | 2013093339 | 6/2013 |

OTHER PUBLICATIONS

Written Opinion and International Search Report PCT/FR2014/051553 dated Oct. 7, 2014.
Jose A. A. Sales et al.: "Some features associated with organosilane groups grafted by the sol-gel process onto synthetic talc-like phyllosilicate", Journal of Colloid and Interface Science, Academic Press, New York, NY, US, vol. 297, No. 1, May 1, 2006 (May 1, 2006), pp. 95-103, XP024909735.
Karine Chabol et al.: "Functionalization of synthetic talc-like phyllosilicates by alkoxyorganosilane grafting", Journal of Chemistry Royal Society of Chemistry UK, vol. 20, No. 43, 2010, pp. 9695-9706, XP002683079.
M. Jaber et al.: "Heavy metal retention by organoclays: Synthesis, applications, and retention mechanism", Chemistry of Materials 20051018 American Chemical Society US, vol. 17, No. 21, (Oct. 18, 2005), pp. 5275-5281.
L. Ukrainczyk et al.: "Template Synthesis and Characterization of Layered Al- and Mg-Silsesquioxanes", Journal of Physical Chemistry. B, Materials, Surfaces, Interfaces and Biophysical, Washington, DC, US, vol. 101, (Jan. 1, 1997), pp. 531-539, XP001118487.
Sandra L. Burkett et al.: "Synthesis, Characterization, and Reactivity of Layered Inorganic-Organic Nanocomposites Based on 2:1 Trioctahedral Phyllosilicates", Chemistry of Materials, American Chemical Society, US, vol. 9, (Jan. 1, 1997), pp. 1071-1073, XP002238619.
Malcom Ross et al.: "Triclinic Talc and Associated Amphiboles from Gouverneur Mining District, New York", The American Mineralogist, vol. 53, May-Jun. 1968, pp. 751-769.

\* cited by examiner

*Primary Examiner* — Shawquia Jackson
(74) *Attorney, Agent, or Firm* — Young & Thompson

(57) ABSTRACT

A method for preparing a composition includes silico/germano-metal particles functionalized by at least one organic group, which involves:—carrying out a hydrothermal treatment of a hydrogel precursor of the silico/germano-metal mineral particles, and—preparing a hydrogel including silico/germano-metal particles having at least one organic group by co-precipitation in an aqueous medium. A composition including functionalized silico/germano-metal mineral particles of which 1% to 75% of the silicon atoms and/or of the germanium atoms are covalently bonded to at least one organic group is also described.

10 Claims, 5 Drawing Sheets

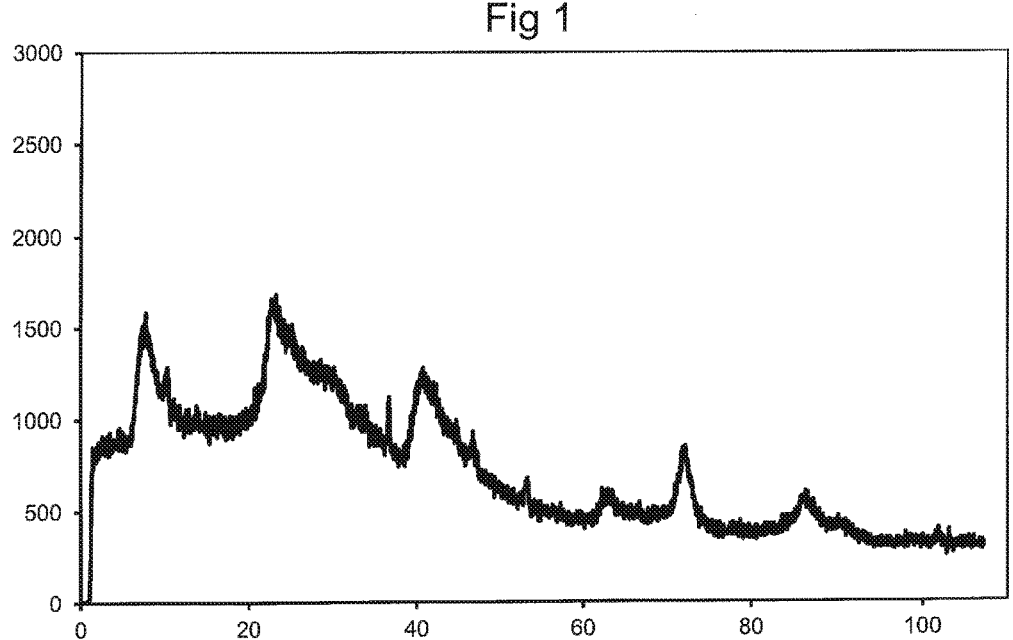
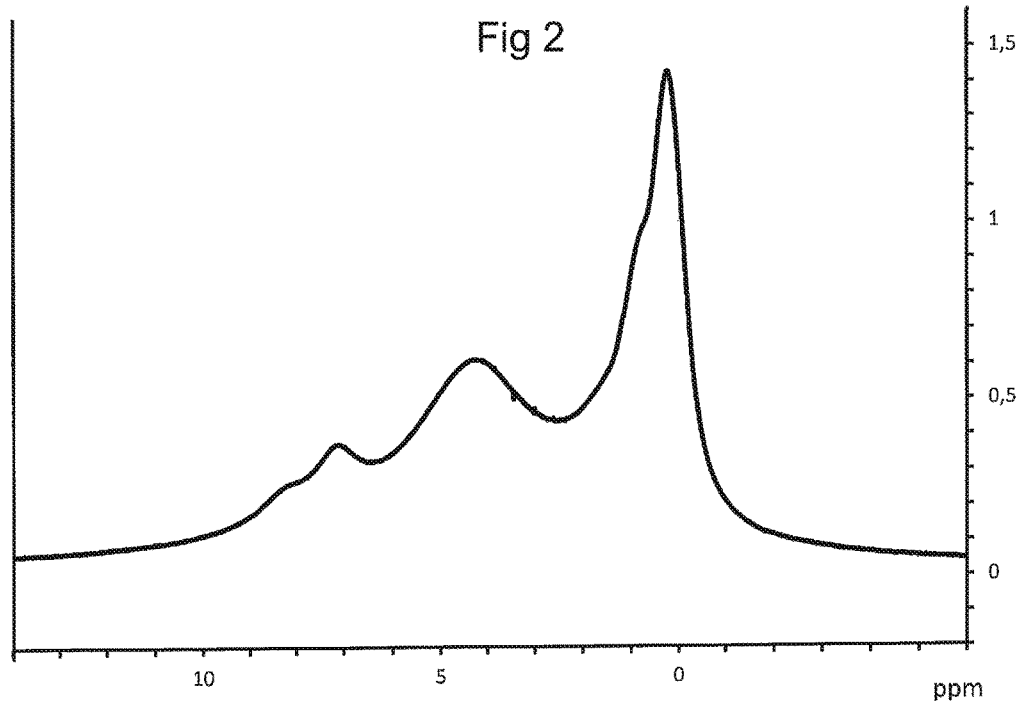

METHOD FOR PREPARING A COMPOSITION COMPRISING FUNCTIONALISED SILICO/GERMANO-METAL PARTICLES AND COMPOSITION OBTAINED

The invention relates to a method for preparing a composition comprising silico/germano-metallic mineral particles functionalised by at least one organic group. The invention relates also to such a composition comprising silico/germano-metallic mineral particles functionalised by at least one organic group.

Throughout the text, "silico/germano-metallic mineral particle" denotes any particle comprising at least one silicon (Si) atom and/or at least one germanium (Ge) atom and at least one metal atom chosen from the group formed of alkali metals, alkaline earth metals and transition metals.

Mineral particles functionalised by at least one organic group, or "hybrid organic-inorganic particles", are of increasing interest in various fields of chemistry, especially in the field of catalysis, owing to their ability to combine certain advantages of organic compounds and of inorganic compounds. The creation of strong interactions between organic and inorganic compounds allows organic species to be durably immobilised on inorganic compounds, imparting to the organic species the structural order of the inorganic compounds.

It is known to functionalise phyllosilicates (lamellar silicates) such as talc by grafting alkoxyorganosilanes. However, the hybrid organic-inorganic materials so obtained do not allow satisfactory grafting rates to be achieved.

As another alternative to the preparation of organic-inorganic hybrids, methods of synthesising such materials directly by the sol-gel route are also known. However, these materials have very poor crystalline properties and structural properties which are far removed from those of natural or non-hybrid synthetic phyllosilicates. Furthermore, such syntheses by the sol-gel route can generally not be carried out in an aqueous medium.

Within this context, the invention aims to propose a method which permits the preparation of a composition comprising hybrid organic-inorganic synthetic silico/germano-metallic mineral particles whose structural properties are similar to those of the phyllosilicates, and especially of talc.

The invention aims to propose such a method which can be carried out simply and quickly and which is compatible with the constraints of industrial exploitation, and which does not produce emissions of polluting chemical compounds.

To that end, the invention relates to a method for preparing a composition comprising silico/germano-metallic mineral particles functionalised by at least one organic group, said particles comprising at least one silicon (Si) atom and/or at least one germanium (Ge) atom and at least one atom of a metal (M) chosen from the group formed of alkali metals, alkaline earth metals and transition metals, wherein:
  a hydrothermal treatment under pressure of a hydrogel precursor of said silico/germano-metallic mineral particles is carried out, characterised in that:
  a hydrogel precursor comprising silico/germano-metallic particles having at least one organic group is prepared by carrying out a coprecipitation reaction in an aqueous medium between:
    at least one metal salt of said metal (M),
    at least one source of silicon and/or of germanium, and
    at least one compound chosen from the water-soluble oxysilanes and oxygermanes having the formula (I):

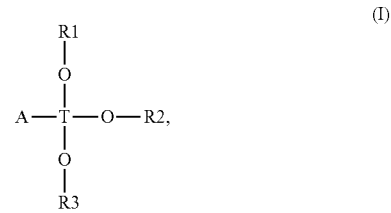

wherein:
  T is chosen from silicon and germanium,
  R1, R2 and R3 are identical or different and are chosen from a hydrogen and linear alkyl groups containing from 1 to 3 carbon atom(s), and
  A is chosen from aliphatic groups, aromatic groups and hydrocarbon groups containing at least one heteroatom.

Wholly unexpectedly, the inventors have found that it is possible to prepare functionalised silico/germano-metallic mineral particles of the hybrid organic-inorganic type by carrying out a hydrothermal treatment of a hydrogel precursor comprising functionalised silico/germano-metallic particles, that is to say having at least one organic group.

Furthermore, it is possible to prepare a hydrogel precursor comprising silico/germano-metallic particles having hydrocarbon groups by a simple precipitation reaction between:
  a metal salt, and
  as the silicon source, a mineral silicon source such as a metasilicate salt—especially sodium metasilicate $Na_2OSiO_2$, potassium metasilicate $K_2OSiO_2$ and ammonium metasilicate $(NH_3)_2OSiO_2$— or silica $SiO_2$, and/or, as the germanium source, a mineral germanium source such as a metagermanate salt—especially sodium metagermanate $Na_2OGeO_2$, potassium metagermanate $K_2OGeO_2$ and ammonium metagermanate $(NH_3)_2OGeO_2$—, and
  an oxysilane (in particular a trialkoxysilane or a trihydroxysilane) and/or an oxygermane which is(are) soluble in water and in the reaction medium comprising said metal salt and the silicon source—especially the metasilicate salt and/or silica—and/or the germanium source—especially the metagermanate salt -.

Advantageously and according to the invention, said precipitation reaction is carried out in an aqueous medium. Accordingly, the preparation of said hydrogel precursor does not require the use of organic solvents which are dangerous to humans or to the environment but can be carried out wholly advantageously in an aqueous medium. In particular, said oxysilane and/or oxygermane used in a method according to the invention is(are) completely soluble in an aqueous medium.

Advantageously and according to the invention, M is a metal chosen from the group formed of magnesium, cobalt, zinc, copper, manganese, iron, nickel and chromium.

Advantageously and according to the invention, the hydrothermal treatment of said hydrogel precursor is carried out at a temperature of from 150° C. to 300° C. so as to allow functionalised silico/germano-metallic mineral particles to be obtained without altering the organic group carried by the hydrogel precursor. The inventors have in fact found, surprisingly, that it is thus possible to obtain silico/germano-metallic mineral particles which, on the one hand, have structural and crystalline properties that are superior to those of the hydrogel precursor and, on the other hand, in which the organic groups carried by the hydrogel precursor are preserved, allowing functionalised silico/germano-metallic mineral particles to be obtained.

In particular, advantageously and according to the invention, said hydrothermal treatment is carried out at a temperature of from 200° C. to 260° C. and especially from 240° C. to 250° C.

Throughout the text, "hydrothermal treatment under pressure" denotes any treatment carried out in a closed receptacle, such as an autoclave, in the presence of water, at a predetermined temperature and at a pressure greater than atmospheric pressure.

Throughout the text, "hydrocarbon group" denotes any group containing carbon and hydrogen atoms and optionally heteroatoms (oxygen, nitrogen, sulfur, phosphorus, etc.).

In particular, the functionalised silico/germano-metallic mineral particles prepared by a method according to the invention comprise at least one chemical bond of the Si-A type, that is to say that at least some of the silicon atoms of said functionalised silico/germano-metallic mineral particles have a chemical bond with at least one organic group A.

Advantageously and according to the invention, said hydrothermal treatment is carried out in the presence of at least one carboxylate salt of the formula R8-COOM', wherein:

M' denotes a metal chosen from the group formed of Na and K, and

R8 is chosen from H and alkyl groups containing fewer than 5 carbon atoms.

In addition, the duration of the hydrothermal treatment is adapted to allow said mineral particles to be obtained, as a function especially of the temperature at which the hydrothermal treatment is carried out. Advantageously and according to the invention, said hydrothermal treatment is carried out for a duration of from 1 second to 30 days, especially from 10 seconds to 24 hours.

Advantageously and according to the invention, the hydrothermal treatment of said hydrogel is carried out in a vessel with a constant volume, for example by means of an autoclave. It can be, for example, an autoclave formed of a nickel-based alloy such as Hastelloy® (marketed by Haynes International, Kokomo, United States) or an autoclave made of titanium or optionally of steel with an inner lining of polytetrafluoroethylene (PTFE). Such an autoclave can have any capacity, for example a capacity ranging from 200 ml to 50 litres.

The hydrothermal treatment can be carried out with or without mechanical stirring. In a particularly advantageous variant of a method according to the invention, said hydrothermal treatment is carried out with mechanical stirring. There can be used for that purpose, for example, an autoclave equipped with an internal metal propeller.

Advantageously and according to the invention, said hydrothermal treatment is carried out at a pressure of from 0.5 MPa (5 bar) to 20 MPa (200 bar). Advantageously and according to the invention, said hydrothermal treatment is carried out under autogenous pressure, that is to say at a pressure that is at least equal to the saturation vapour pressure of water (pressure at which the vapour phase is in equilibrium with the liquid phase). The autogenous pressure reached in the autoclave during the hydrothermal treatment therefore depends especially on the temperature at which said hydrothermal treatment is carried out, on the volume of the autoclave and on the quantity of water present. It is likewise possible to carry out the hydrothermal treatment at a pressure greater than the saturation vapour pressure of water or greater than the autogenous pressure in the vessel in which the hydrothermal treatment is taking place. To that end, a gas that is chemically neutral with respect to the hydrothermal reaction is injected into the autoclave or the receptacle in which the hydrothermal treatment is taking place. Such a gas is chosen from the group formed of the inert gases (rare gases), in particular argon, dinitrogen ($N_2$), carbon dioxide and air (compressed air).

Advantageously and according to the invention there is added to the autoclave, with said hydrogel precursor, a quantity of water (preferably of distilled water) which is at least sufficient to create, inside the autoclave brought to the treatment temperature, a saturation vapour atmosphere.

Advantageously and according to the invention, said hydrogel precursor has the formula $((Si_yGe_{1-y})_x((Si_zGe_{1-z})\text{-}A)_{1-x})_4M_3O_{11}, n'H_2O$, wherein:

Si denotes silicon,

Ge denotes germanium, x is a real number of the interval [0.25; 1[, y is a real number of the interval [0; 1], z is a real number of the interval [0; 1], M denotes the metal atom, n' relates to a number of molecule(s) of water associated with said hydrogel.

The atomic proportions of silicon and germanium carrying organic groups (z and (1-z)) or not (y and (1-y)) can be identical or different, in particular y and z have values which are very similar or identical.

According to another formulation, the hydrogel precursor comprises:

between 0—limit excluded—and 3 molecules of A, 4 silicon and/or germanium atoms according to the following chemical formula: $4 [(Si_yGe_{1-y})_x((Si_zGe_{1-z})\text{-}A)_{1-x}]$, x being a real number of the interval [0.25; 1[, y being a real number of the interval [0; 1] and z is a real number of the interval [0; 1], 3 atoms of metal M, M denoting at least one divalent metal having the formula $Mg_{w(1)}Co_{w(2)}Zn_{w(3)}Cu_{w(4)}Mn_{w(5)}Fe_{w(6)}Ni_{w(7)}Cr_{w(8)}$, wherein each w(i) represents a real number of the interval [0; 1], and such that $$\sum_{i=1}^{8} w(i) = 1,$$

(10−ε) oxygen atoms ((10−ε)O), ε being a real number of the interval [0; 10[, (2+ε) hydroxyl groups ((2+ε) (OH)), ε being a real number of the interval [0; 10[.

The hydrogel precursor therefore has the following chemical formula:

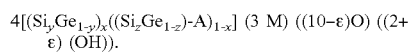

Water molecules can further be bonded to the particles of the hydrogel precursor. These are water molecules adsorbed or physisorbed onto (associated with) the particles of hydrogel precursor and not constituent water molecules that are usually present in the interfoliar spaces of certain phyllosilicate particles.

In an advantageous variant of a method according to the invention, said hydrogel precursor has the formula $(Si_x(Si-A)_{1-x1})_4, M_3O_{11}, nm'H_2O$, wherein:

x is a real number of the interval [0.25; 1[,
A is chosen from aliphatic groups, aromatic groups and hydrocarbon groups containing at least one heteroatom,
M denotes a metal atom,
n' relates to a number of molecule(s) of water associated with said hydrogel.

Advantageously and according to the invention, the group A has the formula (II):

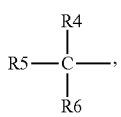
(II)

wherein: R4, R5 and R6 are identical or different and are chosen from H and hydrocarbon groups containing at least one heteroatom. In particular, in formula (II), at least two of the groups R4, R5 and R6 are hydrogens H and the third is chosen from a hydrogen H and a hydrocarbon group containing at least one heteroatom.

Advantageously and according to the invention, in formula (I) A is chosen from a methyl and hydrocarbon groups of the formula $Q\text{-}[CH_2]_n\text{---}$, wherein:

Q is a group containing at least one nitrogen atom,
n is an integer from 3 to 11.

Advantageously and according to the invention, n is an integer from 3 to 11 and in particular from 3 to 5.

Furthermore, advantageously and according to the invention, Q is chosen from $H_2N\text{---}$ and water-soluble cyclic cationic—especially aromatic—groups containing at least one heteroatom.

Advantageously and according to the invention, Q is chosen from groups containing an imidazolium cation or a pyridinium cation or a quaternary ammonium cation.

Advantageously and according to the invention, Q is chosen from the groups of the following formula:

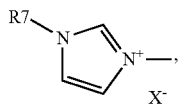

wherein:
R7 is chosen from linear and branched alkyl groups containing from 1 to 18 carbon atom(s),
X' is an anion wherein X is chosen from chlorine, iodine and bromine.

Advantageously and according to the invention, R7 is chosen from linear and branched alkyl groups containing from 1 to 18 carbon atom(s), especially from 1 to 10 carbon atom(s) and in particular from 1 to 4 carbon atom(s).

Advantageously, A is a cationic group. Accordingly, it contributes towards conferring a water-soluble nature upon the compound chosen from the water-soluble oxysilanes and oxygermanes having the formula (I).

More particularly, R1, R2 and R3 each represent methyl ($\text{---}CH_3$) or ethyl ($\text{---}CH_2\text{---}CH_3$) groups. Accordingly, advantageously and according to the invention, said oxysilane has the formula:

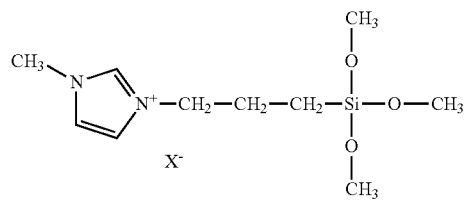

wherein X' is an anion wherein X is chosen from chlorine, iodine and bromine. In this case, the oxysilane (a trialkoxysilane) is a 1-(trimethoxy-silyl-propyl)-3-methyl-imidazolium salt.

In a method according to the invention, the quantities of metal salt, of metasilicate salt and/or of metagermanate salt and of oxysilane and/or of oxygermane are adapted so as to form the desired silico/germano-metallic particles, the structure of the resulting silico/germano-metallic particles of the lamellar silicate being controlled directly by the atomic ratio between the metal M and the silicon and/or germanium (M/[Si+Ge]).

Advantageously and in a particular variant according to the invention, said metal salt, said metasilicate salt—especially sodium metasilicate—and/or the metagermanate salt—especially sodium metagermanat—and said oxysilane and/or oxygermane are brought together so that the atomic ratio between the metal M and the silicon and/or germanium (M/[Si+Ge]) is substantially equal to 0.75. Such an atomic ratio between the metal M and the silicon and/or germanium corresponds to the atomic ratio of a mineral such as talc, which characterises it, and wherein the metal M is magnesium. In that manner there is obtained, for example, a hydrogel precursor comprising silico/germano-metallic particles having the stoichiometry of talc (4 silicon and/or germanium atoms to 3 magnesium atoms). In other words, said silico/germano-metallic particles of the hydrogel precursor (as well as the silico/germano-metallic mineral particles obtained after hydrothermal treatment) comprise 4 silicon and/or germanium atoms to 3 atoms of metal M.

Furthermore, advantageously and according to the invention, the molar ratio between the totality of the oxysilane and oxygermane, on the one hand, and the totality of the metasilicate salts—especially sodium metasilicate—and/or metagermanate salts—especially sodium metagermanate-, on the other hand, is from 0.001 to 3. The molar ratio between the oxysilane and/or oxygermane and the metasilicate salt(s)—especially sodium metasilicate—and/or metagermanate salt(s)—especially sodium metagermanate—corresponds to the number of moles of oxysilane(s) and/or oxygermane(s) over the number of moles of metasilicate salt and/or metagermanate salt brought together in the hydrogel precursor coprecipitation medium.

Accordingly, advantageously and according to the invention, the atomic percentage of oxysilane/oxygermane relative to the total number of moles of silicon/germanium (metasilicate salt and/or metagermanate salt and oxysilane(s) and/or oxygermane) is from 0.1% to 75%, especially from 3% to 60% and more particularly from 5% to 50%. In this manner there is obtained a hydrogel precursor comprising functionalised silico/germano-metallic particles, and then a composition comprising functionalised silico/germano-metallic mineral particles, which can contain hydrocarbon groups in various proportions, and in particular can contain up to 75%, especially up to 50%, silicon and/or germanium atoms covalently bonded to an organic group, especially a group of formula A.

Advantageously and according to the invention, said metal salt used for the preparation of the hydrogel precursor is chosen from the metal salts of magnesium, cobalt, zinc, copper, manganese, iron, nickel and/or chromium. In particular, advantageously and according to the invention, said metal salt is chosen from the metal chlorides of the formula $MCl_2$ and the metal acetates of the formula $M(CH_3COO)_2$ (M being chosen from the group formed of magnesium, cobalt, zinc, copper, manganese, iron, nickel and chromium) and the metal sulfates. Preferably, said metal salt is chosen from $MgCl_2$, $CoCl_2$, $ZnCl_2$, $CuCl_2$, $MnCl_2$, $FeCl_2$, $NiCl_2$, $CrCl_2$ and $Mg(CH_3COO)_2$, $Co(CH_3COO)_2$, $Zn(CH_3COO)_2$, $Cu(CH_3COO)_2$, $Mn(CH_3COO)_2$, $Ni(CH_3COO)_2$, $Cr(CH_3COO)_2$ and $MgSO_4$, $CoSO_4$, $ZnSO_4$, $CuSO_4$, $MnSO_4$, $FeSO_4$, $FeSO_4$, $NiSo_4$, $Cr_2(SO_4)$;

Advantageously and according to the invention, before or after the precipitation reaction of the hydrogel precursor and before or after the hydrothermal treatment, there is carried out an at least partial exchange of the anion $X^-$ by at least one anionic species chosen from a bromide ion $Br^-$, an iodide ion $I^-$, a fluorosulfonate anion, a bis(fluorosulfonyl)amide anion, a bis-(trifluoromethanesulfonyl)amide anion, a trifluoromethanesulfonate anion, a hexafluorophosphate anion, a tetrafluoroborate anion, an acetate anion, a nitrate anion $NO_3^-$ or also a nitrite anion $NO_2^-$. Such an exchange by metathesis allows the more or less hydrophilic or hydrophobic nature of the synthetic silico/germano-metallic mineral particles that are prepared to be modulated in a customised manner. The bis(trifluoromethanesulfonyl)amide anion has, for example, a highly hydrophobic nature.

In particular, advantageously and according to the invention, in order to carry out the hydrothermal treatment, the anion $X^-$ of the hydrogel precursor is chosen so that it has a hardness (according to the hard and soft acids and bases theory or Pearson hardness) which is lower than the hardness of the carboxylate (for example the acetate ion) optionally added before the hydrothermal treatment.

Advantageously and according to the invention, in the case where a trialkoxysilane is used, it is also possible to carry out such an at least partial exchange at the very beginning, that is to say before said coprecipitation reaction is carried out, by adding such an anion to the starting coprecipitation medium.

Advantageously and according to the invention, there is added to the coprecipitation reaction medium at least one acid chosen from hydrochloric acid (HCl), acetic acid ($CH_3COOH$) and sulfuric acid ($H_2SO_4$), the total number of moles of chloride ions and of acetate ions being equal to the number of moles of sodium Na in said coprecipitation reaction medium.

In a variant embodiment according to the invention, said hydrogel coprecipitation reaction is carried out in the presence of an additional salt, especially a salt of the same chemical nature as the salt(s) present in the hydrogel coprecipitation medium, after at least a portion of said hydrogel has been precipitated. Accordingly, there is added to the hydrogel coprecipitation reaction medium, for example, sodium chloride (NaCl) or also a carboxylate salt of the formula R8-COOM', wherein:

M' denotes a metal chosen from the group formed of Na and K, and

R8 is chosen from H and alkyl groups containing fewer than 5 carbon atoms.

The presence of at least one such additional salt allows the hydrogel precursor coprecipitation reaction to be facilitated, especially when the concentration of oxysilane is high (that is to say when x is less than 0.75 and more particularly less than 0.50) and improves the atomic organisation of the hydrogel precursor.

Advantageously and according to the invention, the concentration of additional salt(s) in the hydrogel precursor coprecipitation reaction medium is less than 5 mol/l, for example from 0.2 mol/ll to 4 mol/l.

Advantageously and according to the invention, the hydrothermal treatment is carried out using a liquefied hydrogel precursor having a liquid/solid ratio of from 2 to 20, especially from 5 to 15 (the quantity of liquid being expressed in $cm^3$, and the quantity of solid being expressed in grams and denoting the quantity of dry hydrogel only, that is to say without taking into account the carboxylate salt(s)). If necessary, an appropriate amount of water for achieving that ratio may be added to said liquefied hydrogel precursor.

Advantageously and according to the invention, at the end of a hydrothermal treatment of said hydrogel precursor there is obtained a composition which is in the form of a suspension containing silico/germano-metallic mineral particles.

Advantageously and according to the invention, at the end of the hydrothermal treatment there is recovered a composition comprising functionalised silico/germano-metallic mineral particles in suspension in an aqueous solution of carboxylate salt(s). Said composition can then be subjected to a drying step, after an optional step of washing with water in order to remove at least in part any carboxylate salt(s). Such a washing step comprises, for example, at least one cycle of washing/centrifugation of said composition.

Said composition comprising mineral particles that is obtained by a method according to the invention can further be dried by any powder drying technique. Drying can also be carried out by means of an oven, for example at a temperature of from 60° C. to 130° C., for from 1 hour to 48 hours, by lyophilisation, with microwave irradiation, or also by spraying.

The invention extends to a composition obtainable by a method according to the invention.

The invention therefore relates also to a composition comprising functionalised silico/germano-metallic mineral particles in which from 1% to 75%, especially from 17% to 75%, in particular from 20% to 60%, of the silicon atoms and/or of the germanium atoms are covalently bonded to at least one organic group. This organic group proportion is preferably measured by elemental analysis.

The invention therefore relates to a composition comprising functionalised silico/germano-metallic mineral particles in which from 1% to 75%, especially from 17% to 75%, in particular from 20% to 60% , of the silicon atoms and/or of the germanium atoms are covalently bonded to at least one organic group, wherein said functionalised silico/germano-metallic mineral particles have the formula $((Si_yGe_{1-y})_x((Si_zG_{1-z})-A)_{1-x})_4M_3O_{10}(OH)_2$, wherein:

Si denotes silicon,

Ge denotes germanium, x is a real number of the interval [0.25; 1[, y is a real number of the interval [0; 1], z is a real number of the interval [0; 1], M denotes a metal atom, and A is chosen from aliphatic groups, aromatic groups and hydrocarbon groups containing at least one heteroatom.

Advantageously and according to the invention, A is a cationic group.

Advantageously and according to the invention, A is chosen from the group formed of aliphatic cationic groups, aromatic cationic groups and hydrocarbon cationic groups containing at least one heteroatom.

Advantageously and according to the invention, A denotes a group chosen from the group formed of heteroaromatic organic cationic groups and heteroaliphatic organic cationic groups.

Advantageously and according to the invention, A is a heteroaliphatic organic cationic group having a quaternary ammonium group which is, by nature, cationic.

Advantageously and according to the invention, A is a group of the formula Q-[CH$_2$]$_n$—, wherein:
- Q is chosen from the group formed of heteroaromatic organic cationic groups—that is to say organic cationic groups containing at least one aromatic unit having at least one heteroatom (for example N, S, P)—and heteroaliphatic organic cationic groups—that is to say aliphatic organic cationic groups containing at least one heteroatom (for example N, S, P)—, and
- n is an integer from 3 to 11.

Advantageously and according to the invention, Q is chosen from the group formed of heteroaromatic organic cationic groups containing at least one imidazolium cation, heteroaromatic organic cationic groups containing at least one pyridinium cation and heteroaliphatic organic cationic groups containing at least one quaternary ammonium, which is, by nature, cationic.

Advantageously and according to the invention, Q is a group containing at least one imidazolium cation and having the formula (III) below:

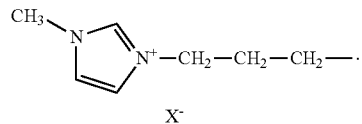

(III)

wherein:
- R7 is chosen from linear and branched alkyls containing from 1 to 18 carbon atom(s),
- X$^-$ is an anion chosen from a chloride anion, an iodide anion, a bromide anion, a fluorosulfonate anion, a bis(fluorosulfonyl)amide anion, a bis(trifluoromethanesulfonyl)amide anion, a trifluoromethanesulfonate anion, a hexafluorophosphate anion, a tetrafluoroborate anion, an acetate anion, a nitrate anion NO$_3^-$ or also a nitrite anion NO$_2^-$.

In particular, advantageously and according to the invention, in the formula $((Si_yGe_{1-y})_xSi_2Ge_{1-z})-A)_{1-x})_4M_3O_{10}(OH)_2$, M is a metal chosen from the group formed of magnesium, cobalt, zinc, copper, manganese, iron, nickel and chromium.

Advantageously, a composition according to the invention has, in X-ray diffraction, a diffraction peak characteristic of a plane (001), especially a single diffraction peak characteristic of a plane (001), situated at a distance between 10 Å and 25 Å. In fact, the inventors have found that the diffraction peak characteristic of the plane (001) is displaced towards the larger distances relative to the diffraction peak of non-functionalised silico/germano-metallic particles. This displacement would be due to the presence of the bonded organic group in the interfoliar spaces of the silico/germano-metallic mineral particles, the organic groups being covalently bonded to the silicon and/or germanium atoms in the totality of the structure and causing an increase in the interfoliar spacing of the particles.

Advantageously and according to the invention, the functionalised silico/germano-metallic mineral particles have an average size of less than 300 nm, especially less than 200 nm.

Advantageously and in a variant, a composition according to the invention comprises functionalised silico-metallic mineral particles having the formula $(Si_x(Si-A) M_3O_{10}(OH)_2$.

According to a particularly advantageous variant of a composition according to the invention, A has the formula:

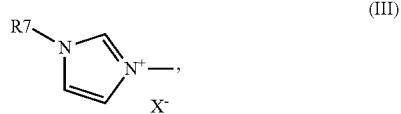

Advantageously and according to the invention, a composition according to the invention comprising silico/germano-metallic mineral particles functionalised by at least one organic group has, in X-ray diffraction, the following characteristic diffraction peaks:
- a plane (001) situated at a distance between 10 Å and 25 Å;
- a plane (020) situated at a distance between 4.45 Å and 4.60 Å;
- a plane (060) situated at a distance between 1.51 Å and 1.53 Å.

The invention relates further to a method and a composition characterised in combination by all or some of the features mentioned hereinabove or hereinbelow.

Other objects, advantages and features of the invention will become apparent upon reading the description and the examples which follow.

A/—GENERAL PROTOCOL FOR THE PREPARATION OF A COMPOSITION COMPRISING FUNCTIONALISED SYNTHETIC SILICO/GERMANO-METALLIC MINERAL PARTICLES ACCORDING TO THE INVENTION

1/—Preparation of a hydrogel precursor comprising synthetic silico/germano-metallic particles Such a hydrogel precursor comprising silico/germano-metallic particles can be prepared by a coprecipitation reaction in an aqueous medium involving, as reagents:
- at least one salt of a metal M chosen from the group formed of magnesium, cobalt, zinc, copper, manganese, iron, nickel and chromium,
- a source of silicon and/or of germanium such as sodium metasilicate Na$_2$OSiO$_2$, sodium metagermanate Na$_2$OGeO$_2$ or also silica SiO$_2$, and
- at least one compound chosen from the oxysilanes and oxygermanes, said oxysilanes and oxygermanes being soluble in water and having the formula (I):

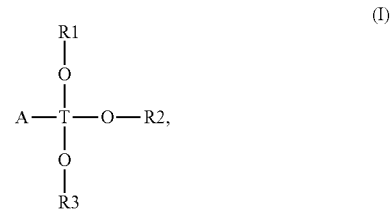

(I)

wherein:
- T is chosen from silicon and germanium,
- A is chosen from aliphatic groups, aromatic groups and hydrocarbon groups containing at least one heteroatom.

A denotes especially a group chosen from a methyl and hydrocarbon groups containing at least one heteroatom, R1, R2 and R3 are identical or different and are chosen from a hydrogen and linear alkyl groups containing from 1 to 3 carbon atom(s).

In particular, said oxysilane can be a trialkoxysilane which is soluble in an aqueous medium and has the following formula:

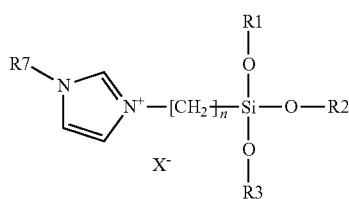

wherein:
R1, R2 and R3 are identical or different and are chosen from H and linear alkyl groups containing from 1 to 3 carbon atom(s), R7 is chosen from linear and branched alkyl groups containing from 1 to 18 carbon atom(s), n is an integer from 3 to 11, and $X^-$ is an anion wherein X is chosen from chlorine, iodine and bromine.

This coprecipitation reaction between the salt(s) of the metal(s) M, the sodium metasilicate and/or metagermanate and the water-soluble oxysilane (trihydroxysilane or trialkoxysilane) is so carried out that the atomic ratio between the metal M and the silicon and/or germanium corresponds to the structure of the lamellar silicate which is to be obtained. In particular, in order to obtain silico/germano-metal particles having the stoichiometry of talc, the atomic ratio is substantially equal to 0.75. The coprecipitation reaction in this case allows a composition comprising silico/germano-metal particles having the stoichiometry of talc (4 silicon (Si) and/or germanium (Ge) atoms to 3 atoms of the metal M) to be obtained.

This reaction is carried out starting from:
1. an aqueous solution of functionalised oxysilane and of sodium metasilicate and/or metagermanate, and
2. a solution of metal salt(s) prepared with one or more metal salt(s) in a solution of hydrochloric acid or acetic acid or sulfuric acid.

The hydrochloric acid HCl and/or the acetic acid and/or the sulfuric acid is/are added to the coprecipitation reaction medium in such a manner that the total number of moles of chloride ions and/or of acetate ions and/or of sulfate ions (from the hydrochloric and/or acetic and/or sulfuric acid and from the metal salt(s)) added is equal to the number of moles of sodium Na (from the sodium metasilicate).

The preparation of this composition comprising synthetic silico/germano-metallic mineral particles is carried out by following the following protocol:
1. the solutions of metal salt(s) are mixed with the solution of oxysilane and sodium metasilicate and/or metagermanate; a coprecipitation hydrogel precursor quickly forms,
2. the gel is stirred (for example for 5 minutes),
3. the hydrogel precursor is recovered after centrifugation (from 2000 to 10,000 revolutions per minute for from 3 to 20 minutes, for example 3500 revolutions per minute for 5 minutes) and removal of the supernatant,
4. the hydrogel precursor is washed with distilled or osmosed water, at least two cycles of washing/centrifugation being carried out,
5. the hydrogel precursor is recovered after centrifugation,
6. the hydrogel precursor recovered after centrifugation is optionally dried, for example by lyophilisation and/or drying in an oven, by drying with microwave irradiation or also by spraying.

Furthermore, it is, for example, possible to add to the solution of sodium metasilicate and/or of sodium metagermanate at least one additional salt such as sodium chloride NaCl or also sodium acetate $CH_3COONa$ (hydrated or non-hydrated). The presence of such a salt allows the hydrogel precursor coprecipitation reaction to be facilitated, especially when the concentration of oxysilane is high, and a hydrogel precursor having improved properties to be obtained. Said salt(s) can be so added that the concentration thereof in the hydrogel coprecipitation reaction medium is, for example, from 0.2 mol/l to 4 mol/l.

At the end of this first precipitation phase there is obtained a hydrogel precursor comprising synthetic silico/germano-metallic particles containing hydrocarbon groups (or "hybrid organic-inorganic hydrogel").

2/—Exchange of $X^-$ by another anion

The composition obtained after drying or not drying the hydrogel precursor comprising silico/germano-metallic particles as obtained above can be added to an aqueous solution comprising, for example, a bromide ion $Br^-$, an iodide ion $I^-$, a chloride ion, a fluorosulfonate anion, a bis(fluorosulfonyl)amide anion, a bis(trifluoromethanesulfonyl)amide anion, a trifluoromethanesulfonate anion, a hexafluorophosphate anion, a tetrafluoroborate anion, an acetate anion, a nitrate anion $NO_3^-$ or also a nitrite anion $NO_2^-$. The concentration of one of those anions in such a solution is from 0.1 $mol.l^{-1}$ to the solubility limit of the chemical species, especially from 0.2 $mol.l^{-1}$ to 3 $mol.l^{-1}$, in particular from 0.3 $mol.l^{-1}$ to 1.5 $mol.l^{-1}$, for example 0.5 $mol.l^{-1}$. Such an exchange by metathesis allows the more or less hydrophilic or hydrophobic nature of the silico/germano-metallic particles that are prepared to be modulated in a customised manner, the bis(trifluoromethanesulfonyl)amide anion being, for example, highly hydrophobic.

Before the hydrothermal treatment is carried out, it is ensured in particular that the anion $X^-$ has a hardness lower than the hardness of the carboxylate (for example the acetate ion) optionally added before the hydrothermal treatment.

3/—Hydrothermal treatment of the hydrogel

The silico/germano-metallic hydrogel $((Si_yGe_{1-y})_x((Si_2Ge_{1-z})-A)_{1-x})_4M_3O_{11}$, $n'H_2O$, dried or not dried, as obtained above is subjected to a hydrothermal treatment at a temperature of from 150° C. to 300° C. and in particular from 150° C. to 300° C.

To that end:
1. the hydrogel, as obtained after precipitation (where appropriate in suspension with the carboxylate salt(s) of the formula R8-COOM') or previously dried, is placed in a reactor/autoclave,
2. if necessary, an aqueous solution comprising at least one carboxylate salt of the formula R8-COOM' (in hydrated or anhydrous form) is added to said hydrogel precursor, with stirring,
3. the liquid/solid ratio is optionally adjusted to a value of from 2 to 20, especially from 5 to 15 (the quantity of liquid being expressed in $cm^3$, and the quantity of solid being expressed in grams and denoting the quantity of dry hydrogel only, that is to say without taking into account the carboxylate salt(s)), 4. the reactor/autoclave is placed inside a furnace or an oven, at a predetermined reaction temperature (set at from 150° C. to 280° C.) throughout the treatment.

During the hydrothermal treatment, the hydrogel precursor gradually acquires a gelatinous consistency. The composition comprising functionalised silico/germano-metallic mineral particles that is obtained at the end of the hydrothermal treatment has a crystallinity which can be observed by X-ray diffraction, the crystallinity increasing with the duration of the hydrothermal treatment and manifesting itself on the corresponding diffractograms by the rapid appearance of characteristic peaks, which become sharper and intensify rapidly throughout the hydrothermal treatment.

The hydrothermal treatment yields, for example, a talcose composition comprising mineral particles of the formula $((Si_yGe_{1-y})_x((Si_zGe_{1-z})-A)_{1-x})_4M_3O_{10}(OH)_2$ in suspension in an aqueous solution, in particular an aqueous solution of carboxylate salt(s).

At the end of the hydrothermal treatment, the composition contained in the reactor is recovered by centrifugation (from 3000 to 15,000 revolutions per minute, for from 5 to 60 minutes) and then removal of the supernatant. The supernatant solution contains the optional salt(s) of the formula R8-COOM' and can be stored for the purpose of recovering the carboxylate salt(s) and recycling them.

The composition comprising functionalised silico/germano-metallic mineral particles that is recovered is then preferably washed with water, in particular with distilled or osmosed water, at least two cycles of washing/centrifugation being carried out.

The composition comprising functionalised silico/germano-metallic mineral particles that is recovered after the last centrifugation can then be dried:

in an oven at a temperature of from 60° C. to 130° C. for from 1 to 24 hours, or also by lyophilisation, for example in a lyophiliser of the CHRIST ALPHA® 1-2 LD Plus type, for from 48 hours to 72 hours, or also by spraying.

The inventors have thus noted that hydrothermal treatment of said functionalised hydrogel precursor is possible and that it permits silico/germano-metallic mineral particles whose structural and crystalline properties are superior to those of the hydrogel precursor, but also in which the organic groups carried by the hydrogel precursor are preserved during the hydrothermal treatment.

B/—ANALYSIS AND STRUCTURAL CHARACTERISATION

The results of the analysis of a composition obtained following the protocol described hereinbefore are reported below. These results confirm that it is possible by means of the invention effectively to form hybrid organic-inorganic mineral particles having structural characteristics (especially in terms of lamellarity and crystallinity) which are very similar to those of non-functionalised phyllosilicates and in particular of non-functionalised talcs.

The phyllosilicates are composed of an irregular stack of elementary lamellae of crystalline structure, the number of which varies from several units to several thousands of units. Among the phyllosilicates (lamellar silicates), the group comprising especially talc, mica and montmorillonite is characterised by the fact that each elementary lamella is constituted by the association of two tetrahedral layers situated on either side of an octahedral layer. This group corresponds to the 2:1 phyllosilicates, which include especially the smectites. In view of their structure, the 2:1 phyllosilicates are also described as being of the T.O.T. (tetrahedron-octahedron-tetrahedron) type.

The octahedral layer of the 2:1 phyllosilicates is formed of two planes of $O^{2-}$ and $OH^-$ ions (in the molar proportion $O^{2-}/OH^-$ of 2/1). On either side of this middle layer there are two-dimensional lattices of tetrahedrons, of which one of the vertices is occupied by an oxygen of the octahedral layer, while the other three are occupied by substantially coplanar oxygens. In the natural smectites, for example, a small proportion of the octahedral and/or tetrahedral sites of the smectites is unoccupied and is responsible for a cation deficit of the crystal lattice forming the elementary lamellae.

The analyses were carried out especially by X-ray diffraction and by nuclear magnetic resonance (NMR) of the solid.

The data collected are presented in the accompanying figures and in the examples commented upon hereinbelow.

In X-ray diffraction (DRX), a natural talc such as a talc from the ARNOLD mine (New York state, USA) is known to have the following characteristic diffraction peaks (according to the publication of Ross M., Smith W. L. and Ashton W. H., 1968, *"Triclinic talc and associated amphiboles from Gouverneur mining district, New York; American Mineralogist"*, volume 53, pages 751-769) :

for the plane (001), a peak situated at a distance of 9.34 Å;

for the plane (002), a peak situated at a distance of 4.68 Å;

for the plane (020), a peak situated at a distance of 4.56 Å;

for the plane (003), a peak situated at a distance of 3.115 Å;

for the plane (060), a peak situated at a distance of 1.52 Å.

FIGS. 1, 5 and 6 show RX diffractograms on each of which there is shown the relative intensity of the signal (number of counts per second) as a function of the interplanar spacing in angstroms.

FIGS. 2 and 7 show proton NMR spectra of compositions obtained by a method according to the invention, carried out by means of a BRUKER® Avance 400® spectrometer.

EXAMPLE 1

Figure 3:
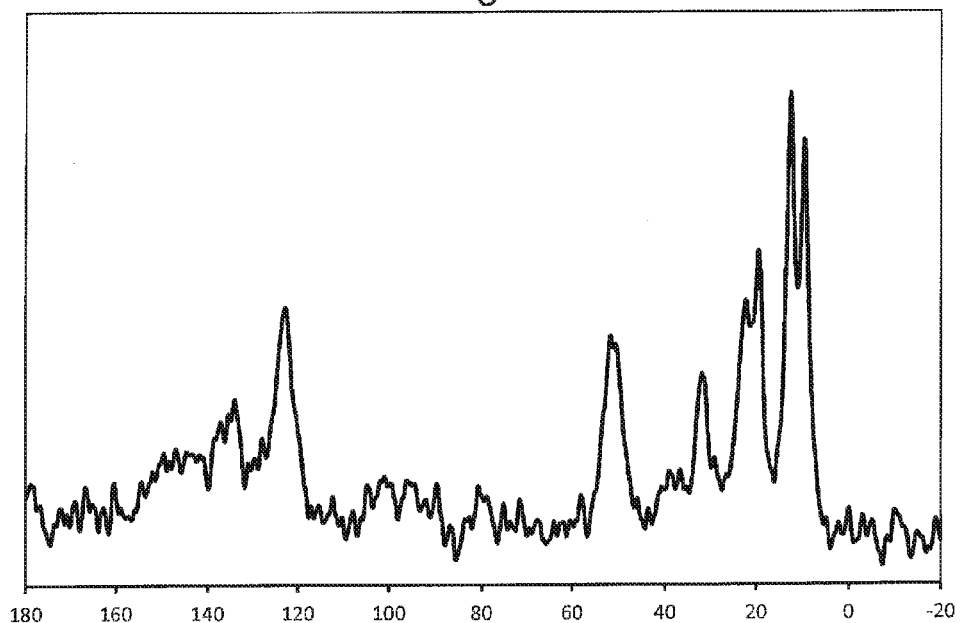
FIGS. 3 and 8 show carbon NMR spectra of compositions obtained by a method according to the invention, carried out by means of a BRUKER® Avance 400® spectrometer.

A functionalised hydrogel is prepared:

On the one hand, a solution of magnesium acetate is prepared by adding 16.97 g of magnesium acetate tetrahydrate ($Mg(CH_3COO)_2$, $4H_2O$) to 52.74 ml of acetic acid $CH_3COOH$ at 1 mol/l.

On the other hand, a solution of functionalised alkoxysilane and of sodium metasilicate is prepared:

A solution of sodium metasilicate is first prepared by adding 17.86 g of sodium metasilicate pentahydrate to 150 ml of distilled water. The solution is heated gently to 40° C. in order to improve the dissolution.

A solution of functionalised alkoxysilane is prepared by adding 6.796 g of 1-(trimethoxy-silyl-propyl)-3-butyl-imidazolium chloride to 50 ml of distilled water.

1-(Trimethoxy-silyl-propyl)-3-butyl-imidazolium chloride has the following chemical formula:

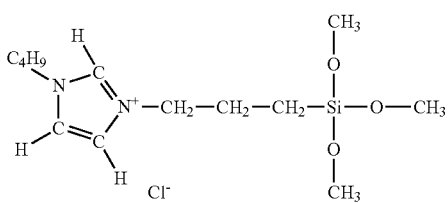

There is then added thereto, with magnetic stirring, a solution comprising 3.155 g of sodium iodide NaI in 10 ml of distilled water, so as to carry out an exchange between the chloride Cl⁻ and iodide I⁻ ions. The solution of functionalised alkoxysilane with sodium iodide NaI is stirred magnetically for 1 minute.

The solution of functionalised alkoxysilane so prepared is then added in its entirety, with magnetic stirring, to the solution of sodium metasilicate previously prepared. Finally, the solution of magnesium acetate is added, with magnetic stirring, to the solution containing the functionalised alkoxysilane and the sodium metasilicate. A silico-metallic gel forms instantaneously. The silico-metallic gel is stirred for 5 minutes and then centrifuged for 5 minutes at 3500 revolutions/minute. It is then washed three times by addition of 100 ml of distilled water and centrifugation (5 minutes at 3500 revolutions/minute) so as to remove the salts formed during the precipitation.

The silico-metallic gel that is recovered is then dried by lyophilisation at -50° C. under 0.064 mbar. After drying by lyophilisation, a white powder is recovered. 19.03 g of a composition comprising functionalised synthetic mineral particles are then recovered.

A hydrothermal treatment of the hydrogel so prepared and obtained is then carried out at a temperature of 243° C. for 6 hours (which duration does not take into account the duration of rise in temperature). The hydrothermal treatment is carried out in the presence of a concentration of sodium acetate of 4 mol/l so as to accelerate the reaction of converting the hydrogel particles into hybrid organic-inorganic talcose particles.

To that end, the hydrogel suspension obtained previously is placed directly into a closed titanium reactor. The titanium reactor is then arranged in a furnace at a temperature of 243° C. for 6 hours.

After cooling to ambient temperature, the reactor is opened and the suspension obtained is centrifuged. After centrifugation there are recovered on the one hand a hybrid organic-inorganic talcose composition and on the other hand a supernatant solution comprising especially sodium acetate, which sodium acetate can then be recovered and optionally recycled.

The hybrid talcose composition recovered is then subjected to two successive cycles of washing with demineralised water and centrifugation.

Finally, the talcose composition recovered after centrifugation is dried in an oven at 60° C. for 12 hours.

In the hybrid organic-inorganic talc particles of the composition so prepared, 20% of the silicon atoms carry a propyl-3-butyl-imidazolium group.

The X-ray diffractogram of the hybrid talc composition so obtained is shown in FIG. 1. The X-ray diffractogram of this talcose composition has diffraction peaks corresponding to the diffraction peaks of a functionalised phyllosilicate, and in particular the following characteristic diffraction peaks:
a plane (001) situated at a distance of 13.461 Å (I=100);
a plane (020) situated at a distance of 4.542 Å (I=86);
a plane (003) situated at a distance of 3.358 Å (I=62);
a plane (060) situated at a distance of 1.526 Å (I=47).

The proton NMR spectrum (FIG. 2) of the hybrid mineral particles makes it possible to identify the presence of the Hs of the Mg(OH) groups of the talc lamellae (chemical shifts between 0 and 1 ppm), of the $CH_2$—Si groups (chemical shifts between 0.5 ppm and 1 ppm), the Hs of the imidazolium ring (chemical shifts between 6 ppm and 9 ppm), the Hs of the Si—OH and/or $CH_2$—C groups (chemical shifts between 1 and 3 ppm) and the Hs of the immediately adjacent $CH_2$s of the imidazolium group and/or of water (chemical shifts between 3 and 5 ppm).

The carbon NMR spectrum (FIG. 3) of the hybrid mineral particles makes it possible to identify the presence of an imidazolium group (chemical shifts between 115 ppm and 140 ppm) as well as the presence of a butyl group and of methylene groups (chemical shifts between 0 ppm and 60 ppm, including the methylene of the $CH_2$-Si bond between 9 ppm and 10 ppm).

Figure 4:
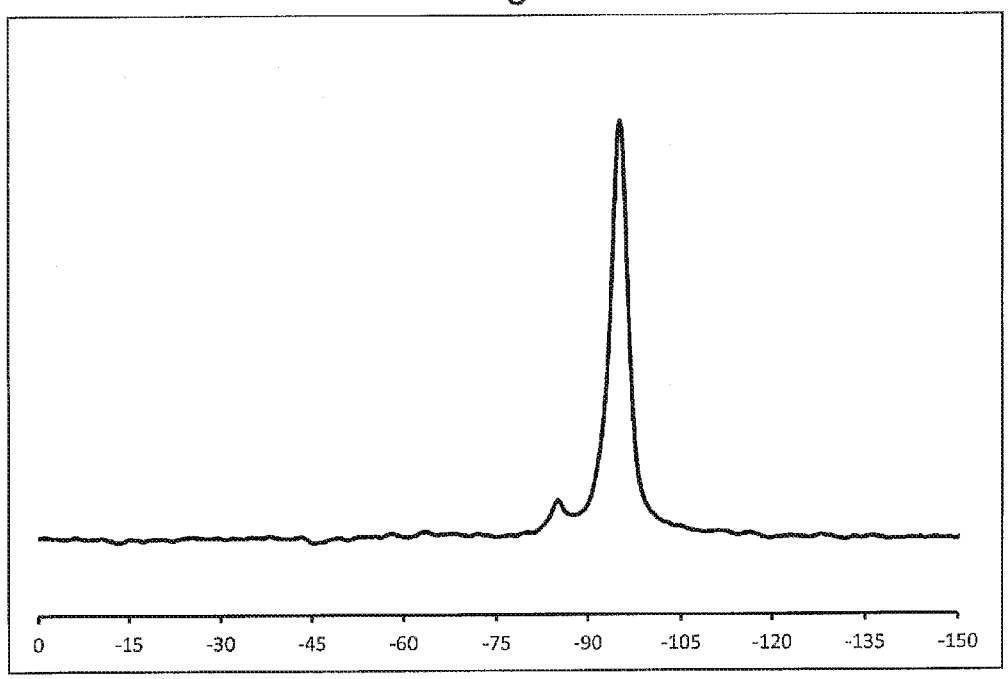
FIGS. 4 and 9 show silicon NMR spectra of compositions obtained by a method according to the invention, carried out by means of a BRUKER® Avance 400® spectrometer.

The silicon NMR spectrum (FIG. 4) of the hybrid mineral particles makes it possible to identify the presence of Si—O—Si groups (chemical shifts between -80 ppm and -100 ppm).

EXAMPLE 2

A functionalised hydrogel corresponding to that prepared in Example 1 is prepared.

A hydrothermal treatment of the hydrogel so prepared and obtained is then carried out at a temperature of 243° C. for 6 hours (which duration does not take into account the duration of rise in temperature).

To that end, the hydrogel suspension obtained previously is placed directly into a closed titanium reactor. The titanium reactor is then arranged in a furnace at a temperature of 243° C. for 6 hours.

After cooling to ambient temperature, the reactor is opened and the suspension obtained is centrifuged. After centrifugation there is recovered a hybrid organic-inorganic talcose composition.

The hybrid talcose composition recovered is then subjected to two successive cycles of washing with demineralised water and centrifugation.

Finally, the talcose composition recovered after centrifugation is dried in an oven at 60° C. for 12 hours.

Figure 5:
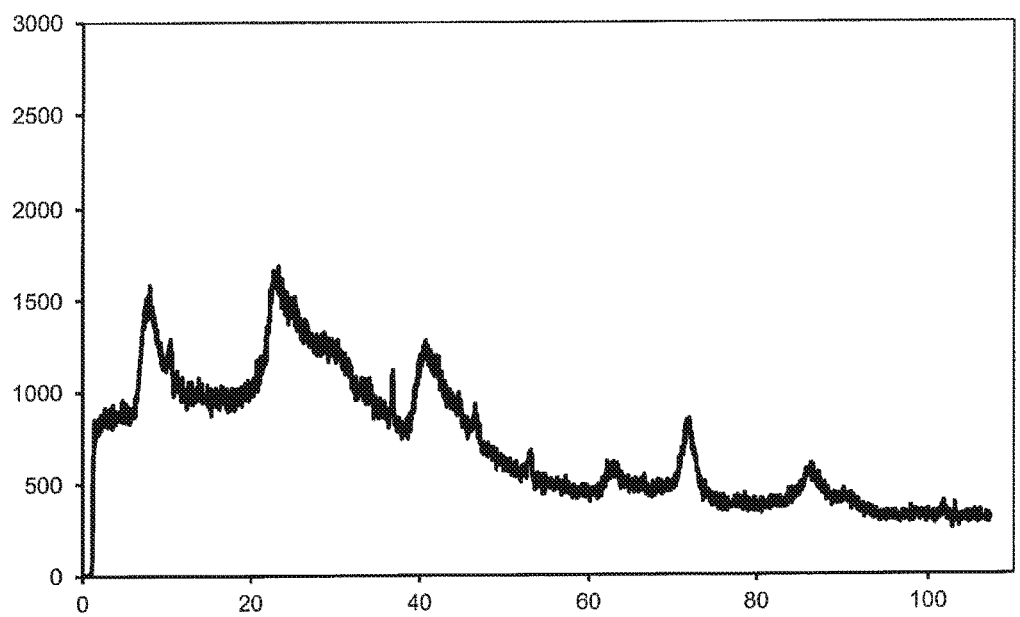

The X-ray diffractogram of the talc composition so obtained is shown in FIG. 5. The X-ray diffractogram of this talcose composition has diffraction peaks corresponding to the diffraction peaks of a functionalised phyllosilicate, and in particular the following characteristic diffraction peaks:
a plane (001) situated at a distance of 13.298 Å (I=96);
a plane (020) situated at a distance of 4.558 Å (I=100);
a plane (003) situated at a distance of 3.485 Å (I=79);
a plane (060) situated at a distance of 1.523 Å (I=49).

In the hybrid organic-inorganic talc particles of the composition so prepared, 20% of the silicon atoms carry a propyl-3-butyl-imidazolium group.

EXAMPLE 3

A functionalised hydrogel is prepared:
On the one hand, a solution of magnesium acetate is prepared by adding 30.24 g of magnesium acetate tetrahydrate ($Mg(CH_3COO)_2$, $4H_2O$) to 94.00 ml of acetic acid $CH_3COOH$ at 1 mol/l.
On the other hand, a solution of functionalised alkoxysilane and of sodium metasilicate is prepared:

A solution of sodium metasilicate is first prepared by adding 31.83 g of sodium metasilicate pentahydrate to 200 ml of distilled water. The solution is heated gently to 40° C. in order to improve the dissolution.

A solution of functionalised alkoxysilane is prepared by adding 10.534 g of 1-(trimethoxy-silyl-propyl)-3-methyl-imidazolium chloride to 50 ml of distilled water.

1-(Trimethoxy-silyl-propyl)-3-methyl-imidazolium chloride has the following structural chemical formula:

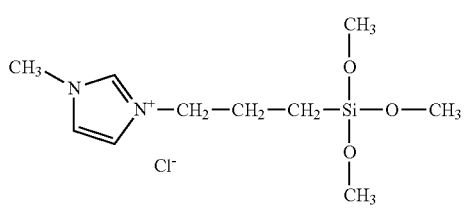

There is then added thereto, with magnetic stirring, a solution comprising 5.62 g of sodium iodide NaI in 10 ml of distilled water, so as to carry out an exchange between the chloride Cl⁻ and iodide I⁻ ions. The solution of functionalised alkoxysilane with sodium iodide NaI is stirred magnetically for 1 minute.

The solution of functionalised alkoxysilane so prepared is then added in its entirety, with magnetic stirring, to the solution of sodium metasilicate previously prepared.

Finally, the solution of magnesium acetate is added, with magnetic stirring, to the solution containing the functionalised alkoxysilane and the sodium metasilicate. A silico-metallic gel forms instantaneously. The silico-metallic gel is stirred for 5 minutes and then centrifuged for 5 minutes at 3500 revolutions/minute. It is then washed three times by addition of 100 ml of distilled water and centrifugation (5 minutes at 3500 revolutions/minute) so as to remove the salts formed during the precipitation.

The silico-metallic gel that is recovered is then dried by lyophilisation at -50° C. under 0.064 mbar. After drying by lyophilisation, a white powder is recovered. 16.60 g of a composition comprising functionalised synthetic particles are then recovered.

A hydrothermal treatment of the hydrogel so prepared and obtained is then carried out at a temperature of 243° C. for 6 hours (which duration does not take into account the duration of rise in temperature). The hydrothermal treatment is carried out in the presence of a concentration of sodium acetate of 4 mol/l so as to accelerate the reaction of converting the hydrogel particles into hybrid organic-inorganic talcose particles.

To that end, the hydrogel suspension obtained previously is placed directly into a closed titanium reactor. The titanium reactor is then arranged in a furnace at a temperature of 243° C. for 6 hours.

After cooling to ambient temperature, the reactor is opened and the suspension obtained is centrifuged. After centrifugation there are recovered on the one hand a hybrid organic-inorganic talcose composition and on the other hand a supernatant solution comprising especially sodium acetate, which sodium acetate can then be recovered and optionally recycled.

The hybrid talcose composition recovered is then subjected to two successive cycles of washing with demineralised water and centrifugation.

Finally, the talcose composition recovered after centrifugation is dried in an oven at 60° C. for 12 hours.

In the hybrid organic-inorganic talc particles of the composition so prepared, 20% of the silicon atoms carry a propyl-3-methyl-imidazolium group.

Figure 6:
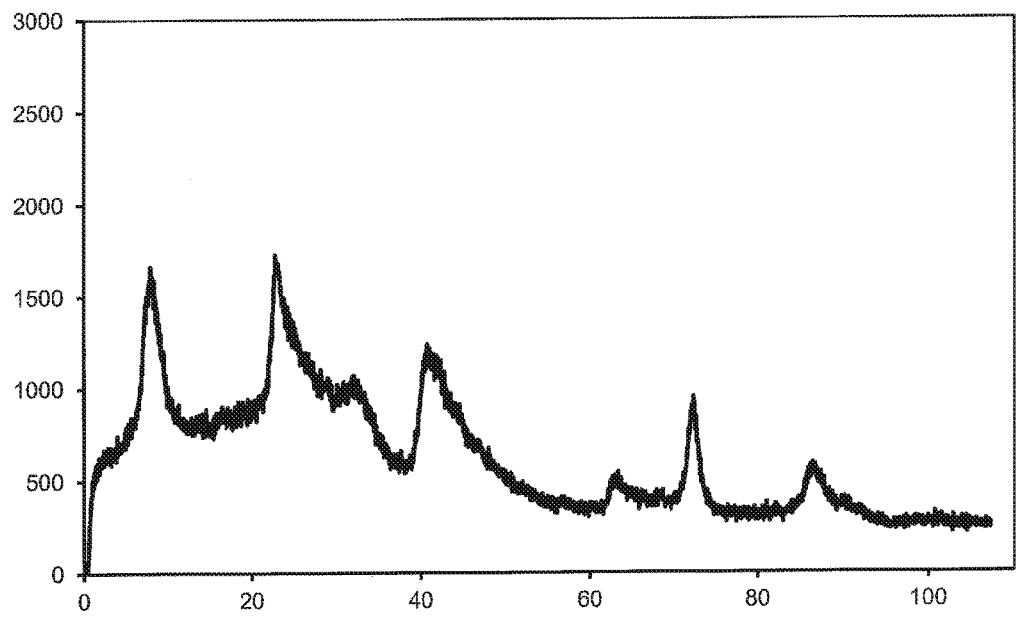

The X-ray diffractogram of the hybrid talc composition so obtained is shown in FIG. 6. The X-ray diffractogram of this talcose composition has diffraction peaks corresponding to the diffraction peaks of talc, and in particular the following characteristic diffraction peaks:
- a plane (001) situated at a distance of 13.118 Å(I=99);
- a plane (020) situated at a distance of 4.476 Å(I=100);
- a plane (003) situated at a distance of 3.252 Å(I=65);
- a plane (060) situated at a distance of 1.516 Å(I=50).

Figure 7:
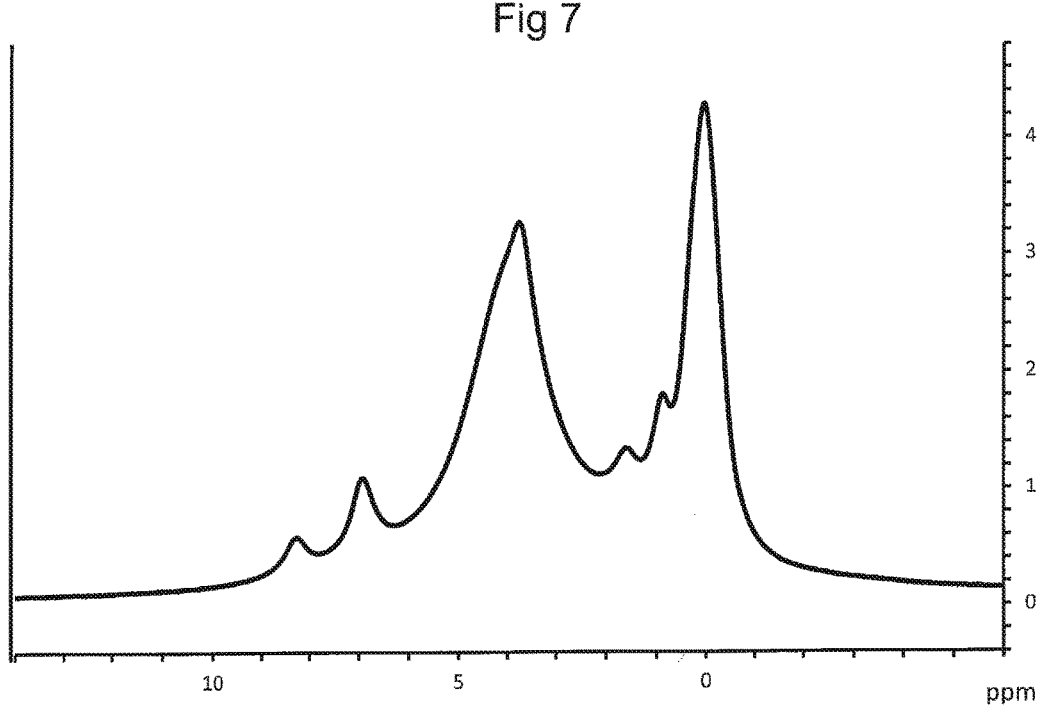

The proton NMR spectrum (FIG. 7) of the hybrid mineral particles makes it possible to identify the presence of the Hs of the Mg(OH) groups of the talc lamellae (chemical shifts between 0 and 1 ppm), of the $CH_2$—Si groups (chemical shifts between 0.5 ppm and 1 ppm), the Hs of the imidazolium ring (chemical shifts between 6 ppm and 9 ppm), the Hs of the Si—OH and/or $CH_2$—C groups (chemical shifts between 1 and 3 ppm) and the Hs of the immediately adjacent $CH_2$s of the imidazolium group and/or of water (chemical shifts between 3 and 5 ppm).

Figure 8:
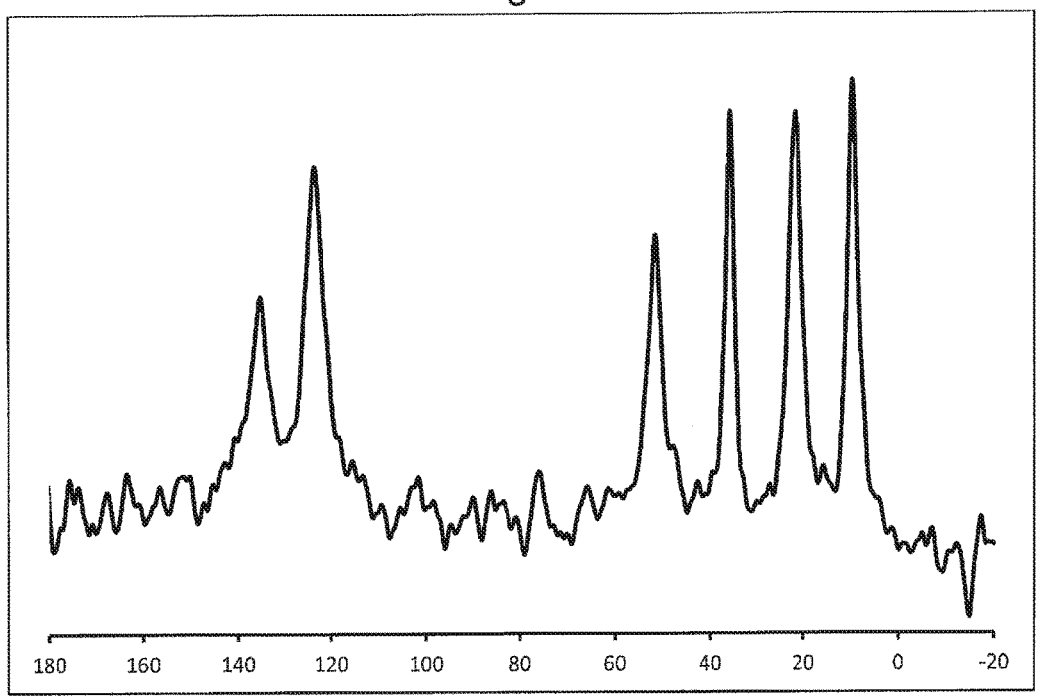

The carbon NMR spectrum (FIG. 8) of the hybrid mineral particles makes it possible to identify the presence of an imidazolium group (chemical shifts between 115 ppm and 140 ppm) as well as the presence of a methyl group and of methylene groups (chemical shifts between 0 ppm and 60 ppm, including the methylene of the $CH_2$—Si bond between 9 ppm and 10 ppm).

Figure 9:
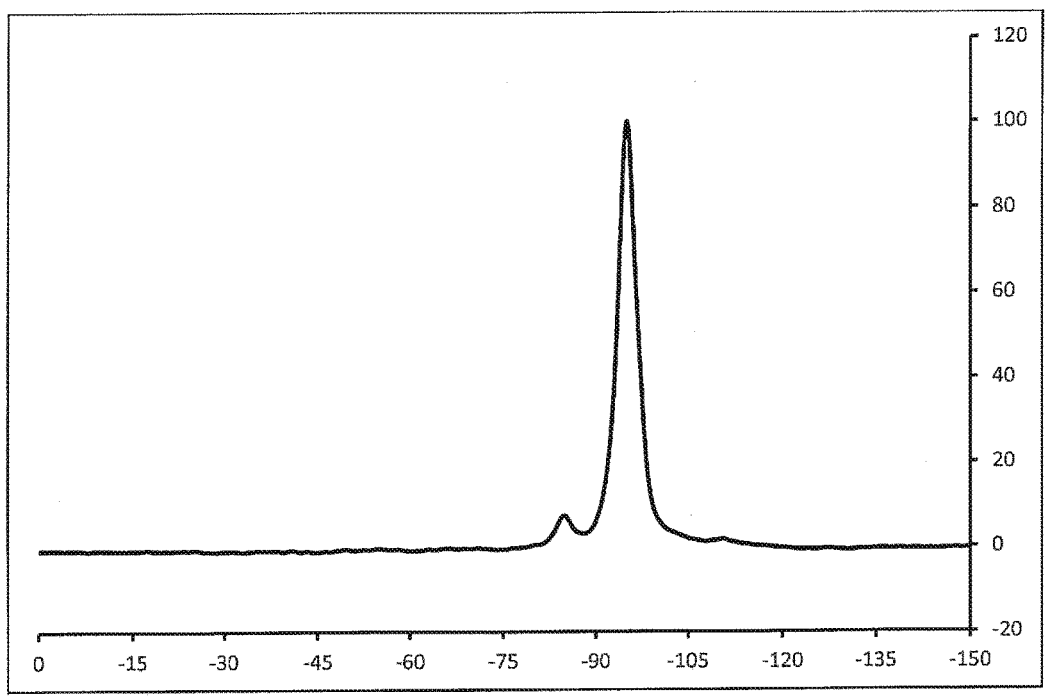

The silicon NMR spectrum (FIG. 9) of the hybrid mineral particles makes it possible to identify the presence of Si—O—Si groups (chemical shifts between -80 ppm and -100 ppm).

The invention can be the subject of many other applications and of different variants with respect to the embodiments and examples described above. In particular, the functionalised mineral particles of a composition according to the invention can be used as a supported ionic liquid (SIL), for example in the field of catalysis.

The invention claimed is:

1. A method for preparing a composition comprising silico/germano-metallic mineral particles functionalised by at least one organic group, said particles comprising at least one silicon (Si) atom and/or at least one germanium (Ge) atom and at least one atom of a metal (M) chosen from the group formed of alkali metals, alkaline earth metals and transition metals, said method comprising:
  carrying out a hydrothermal treatment under pressure of a hydrogel precursor of said silico/germano-metallic mineral particles,
  preparing a hydrogel precursor comprising silico/germano-metallic particles having said at least one organic group by carrying out a coprecipitation reaction in an aqueous medium between:
    at least one metal salt of said metal (M),
    at least one source of silicon and/or of germanium, and
    at least one compound chosen from water-soluble oxysilanes and oxygermanes of formula (I):

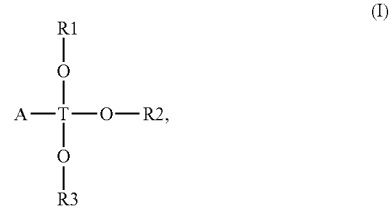

wherein:
T is chosen from silicon and germanium,
R1, R2 and R3 are identical or different and are chosen from a hydrogen and linear alkyl groups containing from 1 to 3 carbon atom(s), and
A is chosen from:
a methyl group, or
a hydrocarbon group of formula Q-[CH$_2$]$_n$—, wherein
Q is selected from the group consisting of H$_2$N—, a water-soluble cyclonic cationic group containing at least one heteroatom, a water-soluble aromatic cyclic cationic group containing at least one heteroatom, and a quaternary ammonium cation, and
n is an integer from 3 to 11.

2. The method according to claim 1, wherein said hydrothermal treatment is carried out in the presence of at least one carboxylate salt of R8-COOM', wherein:
M' denotes a metal chosen from the group formed of Na and K, and
R8 is chosen from H and alkyl groups containing fewer than 5 carbon atoms.

3. The method according to claim 1, wherein said hydrothermal treatment is carried out for a duration of from 1 second to 30 days.

4. The method according to claim 1, wherein said hydrothermal treatment is carried out at a pressure of from 0.5 MPa to 20 MPa.

5. The method according to claim 1, wherein said hydrothermal treatment of said hydrogel precursor is carried out at a temperature of from 150° C. to 300° C.

6. The method according to claim 1, wherein said hydrogel precursor is of formula:

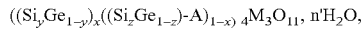

wherein:
Si denotes silicon,
Ge denotes germanium,
x is a real number of the interval [0.25; 1],
y is a real number of the interval [0 ; 1],
z is a real number of the interval [0 ; 1],
M denotes the metal atom, and
n' relates to a number of molecule(s) of water associated with said hydrogel.

7. The method according to claim 1, wherein the group A is of formula (II):

wherein:
R4, R5 and R6 are identical or different and are chosen from H and hydrocarbon groups containing at least one heteroatom.

8. The method according to claim 1, wherein the group A is chosen from:
a methyl group, or
a hydrocarbon group of formula Q-[CH$_2$]$_n$—, wherein:
Q is a group selected from the group consisting of H$_2$N—, a water-soluble cyclic cationic group containing at least heteroatom, and a group of formula

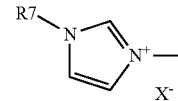

wherein:
R7 is chosen from linear and branched alkyls containing from 1 to 18 carbon atom(s),
X$^-$ is an anion wherein X is selected from the group consisting of chlorine, iodine and bromine, and
n is an integer from 3 to 11.

9. The method according to claim 8, wherein there is carried out an at least partial exchange of the anion X$^-$ by at least one anionic species selected from the group consisting of a chloride anion, an iodide anion, a bromide anion, a fluorosulfonate anion, a bis(fluorosulfonyl)amide anion, a bis(trifluoromethanesulfonyl)amide anion, a trifluoromethanesulfonate anion, a hexafluorophosphate anion, a tetrafluoroborate anion, an acetate anion, a nitrate anion NO$_3^-$ and a nitrite anion NO$_2^-$.

10. The method according to claim 2, wherein said hydrothermal treatment is carried out for a duration of from 1 second to 30 days.

* * * * *